US006847502B1

(12) United States Patent
Codilian (10) Patent No.: US 6,847,502 B1
(45) Date of Patent: Jan. 25, 2005

(54) REPEATABLE RUNOUT DETERMINATION WITHIN A ROTATING MEDIA STORAGE DEVICE

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 390 days.

(21) Appl. No.: 10/185,983

(22) Filed: Jun. 28, 2002

(51) Int. Cl.[7] ............................................. G11B 5/596
(52) U.S. Cl. ................................................. 360/77.04
(58) Field of Search ......................... 360/77.04, 77.02, 360/77.08

(56) References Cited

U.S. PATENT DOCUMENTS 5,402,280 A * 3/1995 Supino .................... 360/77.04
5,867,340 A * 2/1999 Morehouse et al. ..... 360/77.04
5,995,317 A * 11/1999 Ottesen .................... 360/77.04
6,381,292 B1 * 4/2002 Yamakoshi ................ 375/376
6,751,042 B2 * 6/2004 Bi et al. .................. 360/77.02

* cited by examiner

Primary Examiner—Sinh Tran
Assistant Examiner—James L Habermehl
(74) Attorney, Agent, or Firm—Milad G. Shara, Esq.; Blakely, Sokoloff, Taylor & Zafman (57) ABSTRACT

A rotating media storage device (RMSD) includes a disk having at least one track with a plurality of servo wedges, a moveable head, and a microprocessor. The microprocessor receives a plurality of position error signal (PES) values during track following and sums PES values for a plurality of different sets of servo wedges of the track to generate a plurality of shifted summed position error signal (SSPES) values. The microprocessor shifts the plurality of generated SSPES values by a phase shift value to generate a plurality of corrected shifted summed position error signal (CSSPES) values, which correspond to the repeatable runout (RRO) of the disk.

45 Claims, 9 Drawing Sheets

$N$ = The total number of wedges
$W_1 - W_N$ = the Number of each wedge = wedge 1, wedge 2, etc.
$PES(W_i)$ $i = 1$ to $N$ = PES of each wedge $$SSPES(N/2 + n) = \sum_{i=1+n}^{N/2+n} PES(W_i)$$

$$SSPES(50) = \sum_{1}^{50} PES(W_i)$$

$$SSPES(51) = \sum_{2}^{51} PES(W_i)$$

$$SSPES(52) = \sum_{3}^{52} PES(W_i)$$

sets of wedges $\vdash\!\!-\!\!-\!\!-\!\!-\!\!-\!\!-\!\!\dashv$ $n=0$
1        50

$\vdash\!\!-\!\!-\!\!-\!\!-\!\!-\!\!-\!\!\dashv$ $n=1$
2        51

$\vdash\!\!-\!\!-\!\!-\!\!-\!\!-\!\!-\!\!\dashv$ $n=2$
3        52

Corrected SSPES = [SSPES values phase-shifted basic by 90°]
which corresponds to the repeatable runout RRO of the disk.

REPEATABLE RUNOUT DETERMINATION WITHIN A ROTATING MEDIA STORAGE DEVICE

BACKGROUND OF THE INVENTION

1. Field of the Invention

The present invention relates to rotating media storage devices. More particularly, the present invention relates to an apparatus and method for repeatable runout (RRO) determination within a rotating media storage device.

2. Description of the Prior Art and Related Information

A conventional disk drive has a head disk assembly ("HDA") including at least one magnetic disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

Each surface of each disk conventionally contains a plurality of concentric data tracks angularly divided into a plurality of data sectors. In addition, special servo information is provided on each disk or on another disk to determine the position of the head. The most popular form of servo is called "embedded servo" wherein the servo information is written in a plurality of servo wedges that are angularly spaced from one another and interspersed between data sectors around each track of each disk. Each servo wedge generally comprises a track identification (ID) field and a group of servo bursts (an alternating pattern of magnetic transitions) which the servo control system samples to align the transducer head with or relative to a particular servo track or one or more corresponding data tracks. The servo control system moves the transducer head toward a desired track during a coarse "seek" mode using the track ID field as a control input. Once the transducer head is generally over the desired track, the servo control system uses the servo bursts to keep the transducer head over that track in a fine "track follow" mode. The transducer head generally reads the servo bursts to produce a position error signal (PES) that is 0 when the transducer head is at a particular radial position.

The general goal of the servo control system is to control the transducer head position relative to a desired position— i.e. to get it there and to keep it there. There are numerous outside influences, which make it difficult for the servo control system to achieve the desired transducer head position, but a particularly troublesome influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereinafter "RRO"). "Nonrepeatable runout" involves random perturbations due, for example, to spindle runout due to bearing imperfections, and so on (hereinafter NRRO).

In the context of a disk drive, RRO is "repeatable" because it occurs in synchronization with the spinning disk. RRO comes from one or more of the following sources:
a) spindle motor runout;
b) disk slippage;
c) disk warping; and
d) disturbances converted to RRO during the Servo Writing process due, for example, to NRRO, vibrations, resonances, media defects, or disk distortion due to clamping of the HDA.

RRO may also be caused by electromagnetic imperfections due to low quality servo bursts, even if they were mechanically recorded on the ideal circle. This is true because the low quality bursts will yield incorrect position information.

Is Determining the RRO of a disk for use in track following is important because excessive RRO may cause track mis-registration (TMR) problems. Methods of determining RRO and then canceling it by one of a variety of feed-forward techniques are already well known in the art. For example, today, a common method of determining RRO is a time averaging method, in which each servo wedge value is averaged a multitude of times (e.g. hundreds of times). Consequently, the time averaging method requires a multitude of disk rotations to determine the RRO. Thus, present methods of determining RRO require the disk of the disk drive to rotate several hundreds of times before the RRO can be accurately determined.

SUMMARY OF THE INVENTION

The present invention relates to quickly determining repeatable runout (RRO) within a rotating media storage device. In one aspect, the invention may be regarded as a method for repeatable runout (RRO) determination in a rotating media storage device (RMSD). The RMSD includes a disk having at least one track having a plurality of servo wedges, a moveable head, and a servo control loop for controlling the position of the moveable head to perform track following. The method comprises the steps of track following on the plurality of servo wedges of the track to obtain a plurality of position error signal (PES) values, summing the PES values for a plurality of different sets of servo wedges of the track to generate a plurality of shifted summed position error signal (SSPES) values, and shifting the plurality of SSPES values for the track by a phase shift value to generate a plurality of corrected shifted summed position error signal (CSSPES) values corresponding to the repeatable runout.

Preferably, a normalization factor is applied to one of the: generated SSPES values; or the generated CSSPES values. In one embodiment, the normalization factor is a constant divided by one half of the total number of servo wedges of the track. In this embodiment, each set of servo wedges includes a predetermined number of servo wedges that is one-half of the total number of servo wedges of the track. Moreover, in this embodiment, the phase shift value is one-quarter of the total number of servo wedges of the track. Also, the amplitude of one of the SSPES values or the CSSPES values may be modified based on an error rejection curve for the servo control loop.

In another aspect, the invention may be regarded as a RMSD having a disk including at least one track having a plurality of servo wedges, and a moveable head. Further, the RMSD includes a servo control loop for controlling the position of the moveable head to perform track following on a plurality of servo wedges of the track and to measure a plurality of position error signal (PES) values. Also, the RMSD includes a microprocessor under the control of a program to receive the plurality of PES values, sum the PES values for a plurality of different sets of servo wedges of the track to generate a plurality of shifted summed position error signal (SSPES) values, and shift the plurality of SSPES values for the track by a phase shift value to generate a plurality of corrected shifted summed position error signal (CSSPES) values. In still another aspect, the invention may be regarded as a computer system comprising a host computer and an RMSD, in which the RMSD further comprises a disk including at least one track having a plurality of servo wedges, a moveable head, and a servo control loop for controlling the position of the moveable head to perform track following on a plurality of servo wedges of a track and to measure a plurality of position error signal (PES) values. Also, the RMSD includes a microprocessor under the control of a program to receive the plurality of PES values, sum the PES values for, a plurality of different sets of servo wedges of the track to generate a plurality of shifted summed position error signal (SSPES) values, and shift the plurality of SSPES values for the track by a phase shift value to generate a plurality of corrected shifted summed position error signal (CSSPES) values.

DETAILED DESCRIPTION

Figure 1:
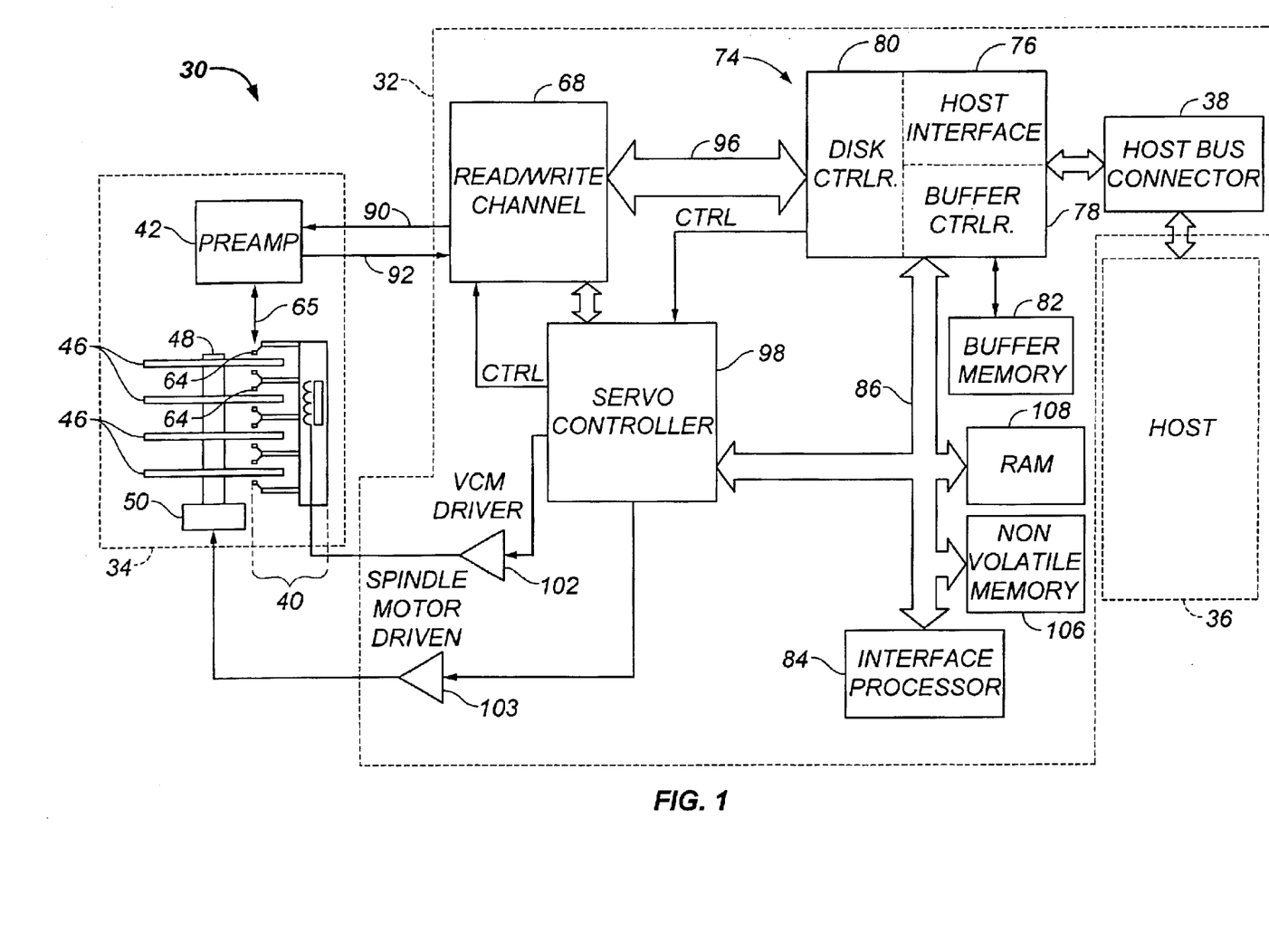
FIG. 1 shows a block diagram of a rotating media storage device (RMSD), such as a disk drive, in which the invention may be practiced.

FIG. 1 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Advanced Technology Attachment (ATA) standard presently favored for desktop personal computers. Disk drive 30 comprises a Head/Disk Assembly, HDA 34, and a controller printed circuit board assembly, PCBA 32.

HDA 34 comprises: one or more disks 46 for data storage; a spindle motor 50 for rapidly spinning each disk 46 (four shown) on a spindle 48; and an actuator assembly 40 for swinging a plurality of moveable transducer heads 64 in unison over each disk 46. The moveable transducer heads 64 are connected to a preamplifier 42 via a cable assembly 65 for reading and writing data on disks 46. Preamplifier 42 is connected to channel circuitry in controller PCBA 32 via read 11 data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention related to fast repeatable runout (RRO) determination.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103. Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sector information is demodulated by channel 68, and digital information is provided to servo controller 98 and is processed by servo controller 98 to provide position information to microprocessor 84 via bus 86. Each servo wedge generally comprises a track identification (ID) field and a group of servo bursts (an alternating pattern of magnetic transitions) which the servo control system samples to align the moveable transducer head 64 with or relative to a particular servo track or one or more corresponding data tracks. The servo controller 98 moves the transducer head 64 toward a desired track during a coarse "seek" mode using the track ID field as a control input. Once the transducer head 64 is generally over the desired track, the servo controller 98 uses the servo bursts to keep the transducer head over that track in a fine "track follow" mode. The transducer head 64 generally reads the servo bursts to produce a position error signal (PES) that is 0 when the transducer head 64 is at a particular radial position. In this way, the servo controller 98 implements a servo control loop for controlling the position of the moveable transducer head 64 to perform track following on the plurality of servo wedges of the track.

Figure 2:
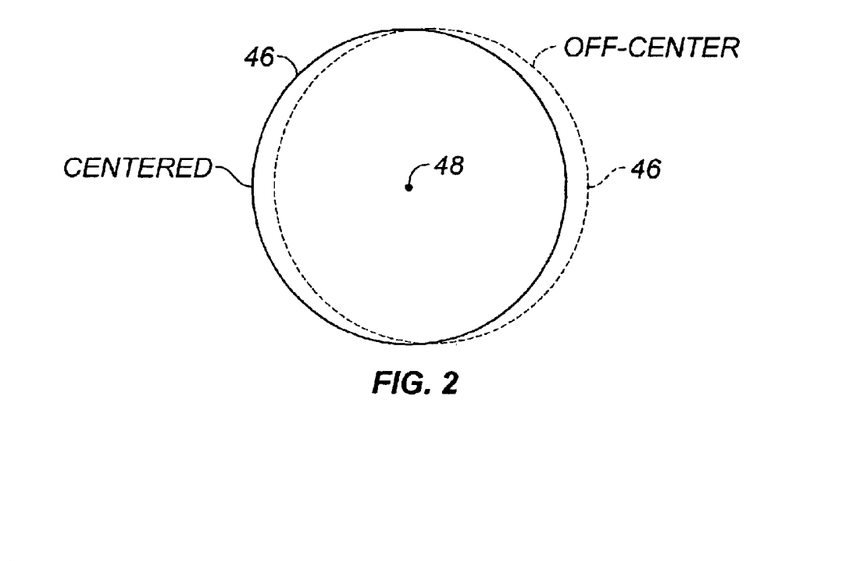
FIG. 2 illustrates a common situation in which a disk has been displaced from the spindle and is off-center thereby creating repeatable runout (RRO) errors.

Turning now to FIG. 2, FIG. 2 illustrates a common situation in which a disk 46 has been displaced from the spindle 48 and is off-center thereby creating repeatable runout (RRO) errors. As previously discussed, RRO involves periodic deviations that occur with predicable regularity. In the context of a disk drive 30, RRO is "repeatable" because it occurs in synchronization with the spinning disk 46. RRO typically comes from one or more of the following sources: spindle motor runout; disk slippage; disk warping; and disturbances converted to RRO during the Servo Writing process due, for example, to non-repeatable runout (NRRO), vibrations, resonance, media defects or disk distortion due to clamping of the head disk assembly (HDA). Thus, in this example, the full disk 46 has shifted and is off-center as shown in FIG. 2. Often, this type of RRO is termed once around RRO. Because of the disk shift, the disk 46 often travels in an elliptical fashion such that the servo controller 98 experiences a repeatable series of negative position error signal (PES) values and positive PES values. The present invention provides for fast repeatable runout (RRO) determination. As previously discussed, the disk drive 30 has a disk 46 including at least one track having a plurality of servo wedges, and a moveable transducer head 64. The disk drive 30 further includes a servo control loop, implemented via the servo controller 98, for controlling the position of the movable head 64 to perform track following on the plurality of servo wedges of the track and to measure a plurality of position error signal (PES) values. Moreover, the disk drive 30 includes a microprocessor 84 under the control of a program to receive the plurality of PES values, sum the PES values for a plurality of different sets of servo wedges of the track to generate a plurality of shifted summed position error signal (SSPES) values, and shift the plurality of SSPES values for the track by phase shift value to generate a plurality of corrected shifted summed position error signal (CSSPES) values which correspond to the repeatable runout (RRO) of the disk 46.

Preferably, a normalization factor is applied to one of: the generated SSPES values; or the generated CSSPES values. In one embodiment, the normalization factor is a constant divided by one half of the total number of servo wedges of the track. In this embodiment, each set of servo wedges includes a predetermined number of servo wedges that is one-half of the total number of servo wedges of the track. Moreover, in this embodiment, the phase shift value is one-quarter of the total number of servo wedges of the track. Also, the microprocessor may modify the amplitude of the SSPES values or CSSPES values based on an error rejection curve for the servo control loop.

Figure 3A:
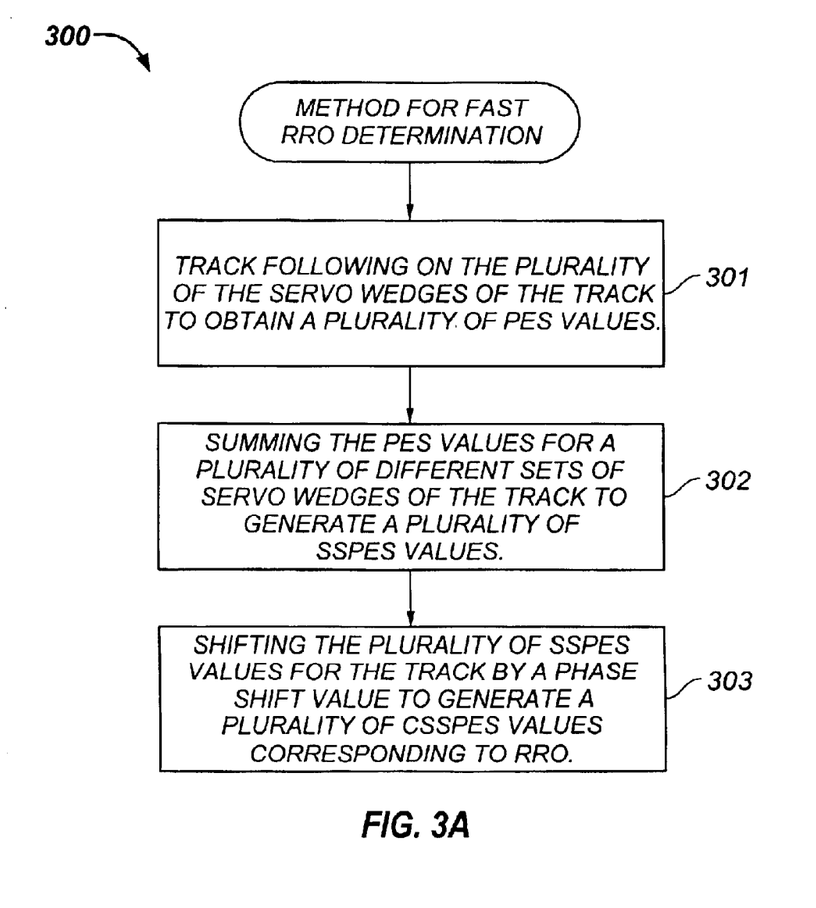
FIG. 3A is a flowchart showing a method of the invention for fast repeatable runout (RRO) determination.

Referring now to FIG. 3A, a flowchart of a method 300 of the invention for fast repeatable runout (RRO) determination is illustrated. At step 301, track following on the plurality of the servo wedges of the track is performed to obtain a plurality of PES values. Next, at step 302, the PES values for a plurality of different sets of servo wedges of the track are summed to generate a plurality of shifted summed position error signals (SSPES) values. Then, at step 303, the plurality of SSPES values for the track are shifted by a phase shift value to generate a plurality of corrected shifted summed position error signals (CSSPES) values corresponding to the repeatable runout (RRO) for the track.

Figure 3B:
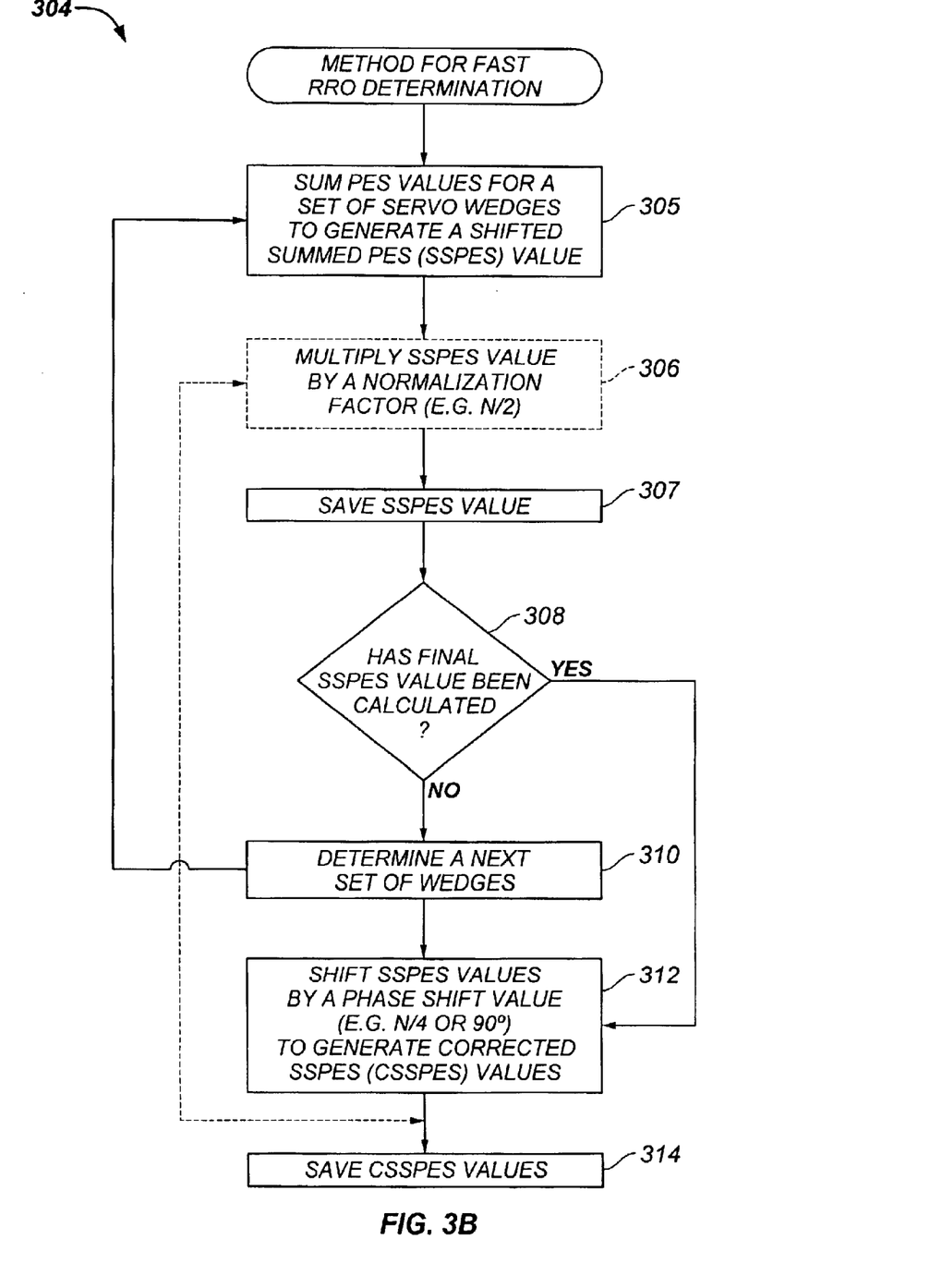
FIG. 3B is a flowchart showing another embodiment of the method of the invention for fast RRO determination.

Turning now to FIG. 3B, a flowchart of a more detailed embodiment of the method of the invention for fast RRO determination is illustrated. The method 304 of FIG. 3B will also be discussed with reference to FIG. 4, which shows exemplary graphs of PES, SSPES, and CSSPES values to aid in illustrating the particular method steps.

Figure 4:
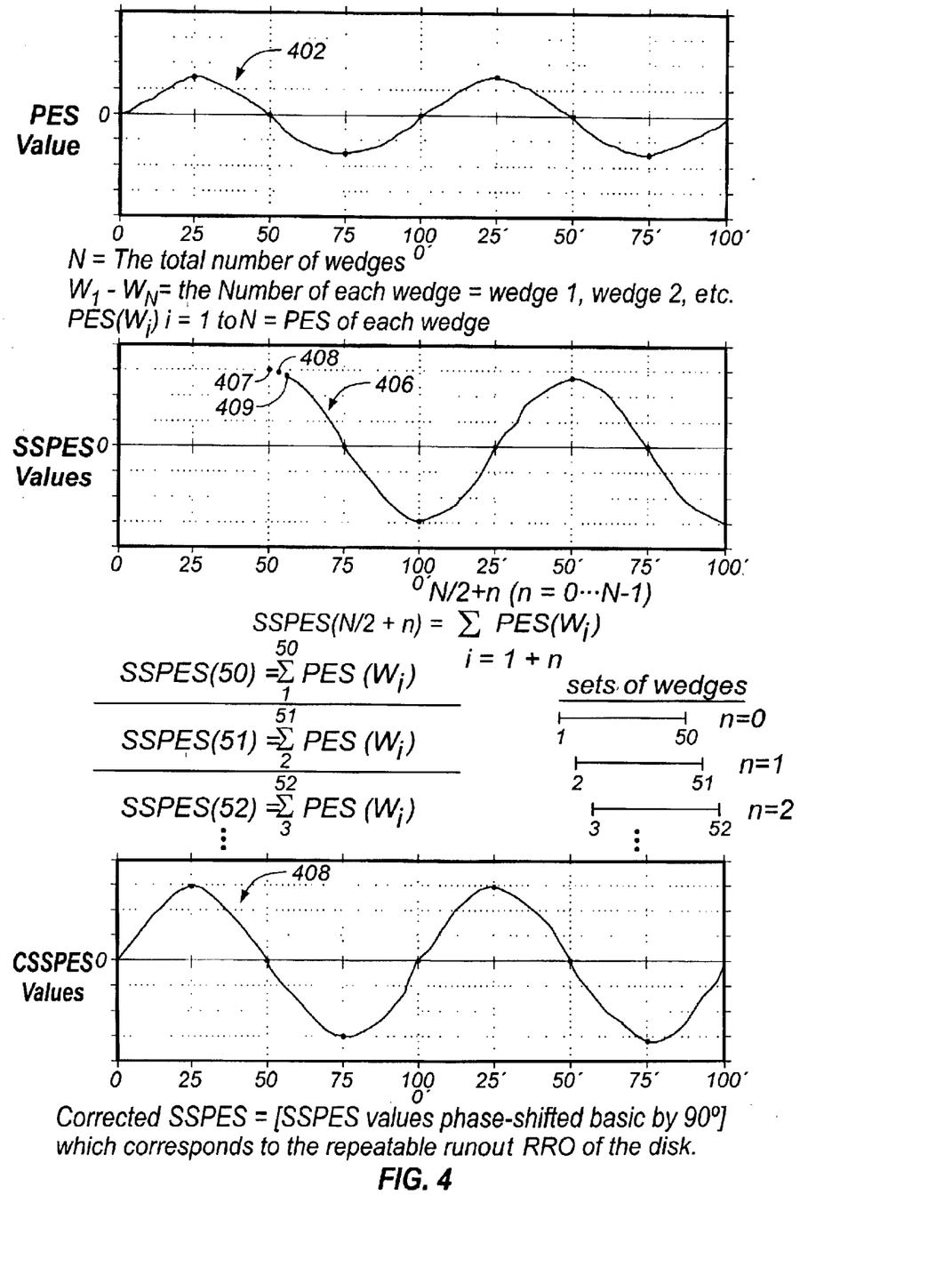
FIG. 4 shows exemplary graphs of PES, SSPES, and CSSPES values to aid in illustrating the particular method steps of FIG. 3B.

Starting with step 305, track following is performed on the servo wedges of a track to obtain a plurality of PES values and further the PES values for a set of these servo wedges are summed to generate a shifted summed PES (SSPES) value, as will be discussed. As shown in FIG. 4, line 402 (not drawn to scale) illustrates the PES values obtained during track following over servo wedges 0 to 100 and then over servo wedges 0' to 100' (i.e. servo wedges 0' to 100' representing the same servo wedges 0 to 100 during another rotation of the disk). Line 402 illustrates that the disk is off-center and follows an elliptical path resulting in a series of repetitive positive PES values and negative PES values in sinusoidal fashion as the disk rotates off-center about the spindle.

Discussion will briefly proceed as to the mathematics involved in generating the shifted summed PES (SSPES) value. A SSPES value is generated by the equation shown in FIG. 4, land as shown specifically, below:

$$SSPES(N/2+n) = \sum_{i=1+n}^{N/2+n(n=0...N-1)} PES(W_i)$$

Particularly, N=the total number of wedges of the track (e.g. 100); i=any number between 1 to N; $W_i$=the number of each wedge (e.g. wedge 1, wedge 2, etc.); and PES ($W_i$)=the PES value of each wedge $W_i$.

Thus, as shown by line 406, in which the SSPES values are charted against the wedge number, a SSPES value is calculated based upon the measured PES values for a set of wedges, $W_i$. For example, the SSPES value at wedge 50 is determined by the equation:

$$SSPES(50) = \sum_{1}^{50} PES(W_1)$$

where the set of wedges $W_i$ for this case ranges from wedge 1 to wedge 50, with n=0.

For example, the SSPES value for wedge 50 is shown as point 407 on line 406.

At step 308, the method determines whether or not the final SSPES value has been calculated. If not, at step 310, a next set of wedges is determined and the method returns to method step 305. To determine the next set of wedges, the n value of the previously described SSPES equation is incremented by 1. In the current example, as shown in FIG. 4, when n=0 the set of wedges is 1–50. In determining the next set of wedges n is incremented by 1, to n=1, such that the next set of wedges, in this example, is equal to wedges 2–51. In this case, the SSPES value for wedge 51 is calculated as follows:

$$SSPES(51) = \sum_{2}^{51} PES(W_i)$$

where the set of wedges W., for this case ranges from wedge 2–51, with n=1.

For example, the SSPES value for wedge 51 is shown as point 408 on line 406. As yet one other example, the SSPES value for n=2, i.e. the SSPES value for wedge 52 is calculated as:

$$SSPES(52) = \sum_{3}^{52} PES(W_i)$$

where the set of wedges $W_i$, for this case ranges from wedge 3–52 with n=2.
For example, the SSPES value for wedge 52 is shown point 409 on line 406. It should be appreciated by those skilled in the art that the SSPES formula can then be utilized to calculate a SSPES value for each wedge of the track that is measured.

Returning again to FIG. 3B, at step 306, a normalization factor may be applied to the previously calculated SSPES value. For example, the SSPES value can be multiplied by a normalization factor such as $$\frac{\pi/2}{N/2},$$

where N equals the total number of wedges of the track. This is because $\pi/2$ corresponds to the average value of one half of a sinc wave. It should be noted that $\pi/2$ is equal to 1.57, which will be used hereinafter. In this particular example, the previously discussed SSPES equation becomes:

$$SSPES(N/2+n) = \frac{1.57}{N/2} \sum_{i=1+n}^{N/2+n(n=0,\ldots N-1)}$$

Therefore, the previous SSPES values at wedge 50, 51, and 52 are now calculated as:

$$SSPES(50) = 1.57/50 \sum_{1}^{50} PES(W_i)$$

where the set of wedges $W_i$ for this case ranges from wedge 1 to wedge 50, with n=0;

$$SSPES(51) = 1.57/50 \sum_{2}^{51} PES(W_i)$$

where the set of wedges $W_i$, for this case ranges from wedge 2–51, with n=1; and $$SSPES(52) = 1.57/50 \sum_{3}^{52} PES(W_i)$$

where the set of wedges W., for this case ranges from wedge 3–52 with n=2.

As previously described, the normalization factor, in this instance, is the variable $$\frac{1.57}{N/2}.$$

Thus, in this example, the normalization factor is the inverse of one-half of the total number of servo wedges of the track multiplied by a constant of 1.57. However, it should be appreciated that other normalization factors can be utilized.

Also, it should be appreciated that the use of the normalization factor is optional, and the normalization factor can be applied at other points in the method 304, as will be discussed. At step 307, the SSPES values maybe saved. Furthermore, it should be appreciated that to bound the above-described SSPES equation, that anytime (N/2+n) at the top of the summation sign becomes greater than N, then (N/2+n) must be subtracted by a multiple of N, which is smaller than (N/2+n). For example, in the case where N=100, and n has been iterated to a value of 98, then (N/2+n) is equal to 148 which is greater than N=100. Since this number is greater than N=100, then 100 must be subtracted from 148 resulting in a primed wedge number 48', as shown in FIG. 4, illustrating the fact that the wedges will be sampled on consecutive rotations.

Figure 5:
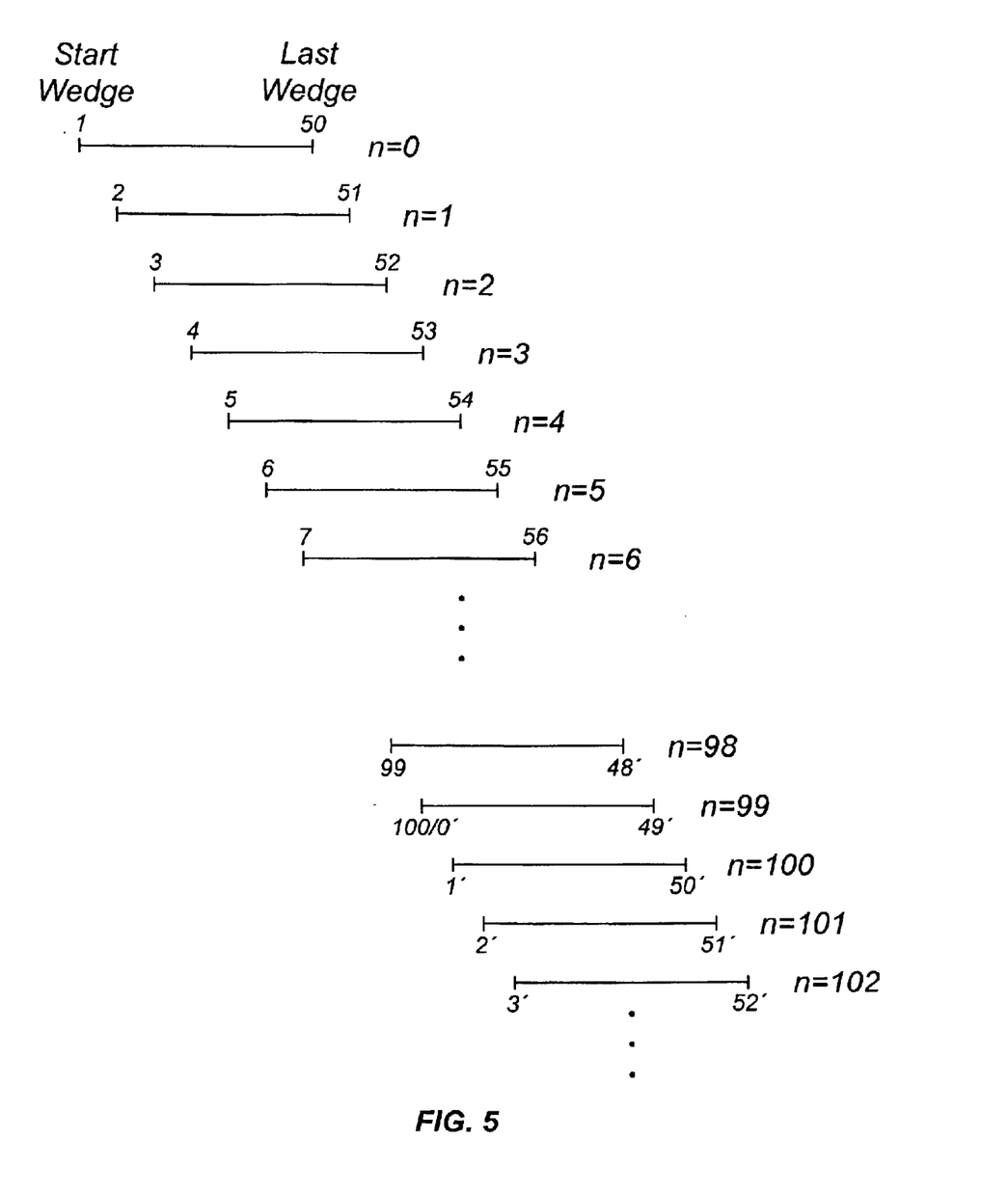
FIG. 5 illustrates an example of a number of different sets of wedges used in computing SSPES and CSSPES values.

For example, looking briefly at FIG. 5, a number of different sets of wedges used in computing the SSPES values are illustrated. In this example, a first set of servo wedges 1–50 (n=0), a second set of wedges 2–51 (n=1), a third set of wedges 3–52 (n=2), etc., continuing to a seventh set of wedges 7–56 (n=6), are shown, and then as n continues to be increasingly incremented, the previously described concept of subtracting a multiple value of N from (N/2+n) comes into play. Examples of this concept are shown in FIG. 5 as 99–48' (n=98), 100/0'–49'(n=99), 1'–50' (n=100), 2'–51 (n=101), etc.

Also, it should be appreciated that in this example each set of wedges includes a predetermined number of wedges that is one half of the total number of wedges of the track N, e.g. N/2 (and in this particular example 50). However, it should also be appreciated that other predetermined number of wedges for each wedge set may be used such as one quarter of the total number of wedges of the track N, e.g. N/4 (e.g. 25). Moreover, it should be further appreciated that other integral divisors of the total number of wedges of the track can be used as the predetermined number of wedges for each wedge set, for example, N/8, N/16, N/32, etc.

Returning again to method step 308 of FIG. 3B, if the final SSPES value has been calculated (e.g. SSPES=100' in FIG. 4), then the method proceeds to step 312. At step 312, the SSPES values are shifted by a phase shift value to generate corrected SSPES (CSSPES) values, which correspond to the repeatable runout (RRO) of the disk. Particularly, again referring to FIG. 4, the CSSPES values (shown as line 408) are exactly the same as the SSPES values, except that they are phase shifted. In this example, the SSPES values are shifted, such that the CSSPES values corresponding to the repeatable runout (RRO) of the disk are in phase with the moveable head performing track following and the PES values (line 402) measured by the servo control loop. Particularly, line 408 representing the CSSPES values are exactly the same as line 406 showing the SSPES values, except that line 408 is phase shifted back by a lead of 90° or by a lag of 270°, to be in synchronization with moving head performing track following and the resultant measured PES values (line 402). Also, after step 312, process step 306 (previously discussed) may instead be performed to provide for normalization. At step 314 of the FIG. 3B, the CSSPES values may be saved. Utilizing the determined in-phase CSSPES values corresponding to the RRO of the track of the disk, the RRO can be compensated for during track following by a variety of well-know techniques, such as feed-forward techniques.

In this example the phase shift value was 90° corresponding to a phase shift value of one-quarter of the total number of servo wedges of this track, e.g. N divided by 4. However, it should also be appreciated that other phase shift values can also be used, such as 45° corresponding to ⅛th of the total number of servo wedges of the track, e.g. N/8. Also, it should be further appreciated that other integral divisors of the total number of servo wedges of the track can be used to generate the phase shift value, for example, N/16, N/32, etc. These values correspond to other harmonics. After the once around value is recovered, this value may be subtracted from collected PES values and the second order harmonic can be determined by the same approach. Further, the same approach can be used to recover higher harmonics as well.

Thus, the SSPES and CSSPES values can be determined quickly in one full rotation of the disk. Moreover, SSPES and CSSPES values for even more rotations of the disk can also be calculated and averaged to gain even better accuracy. This is in comparison to the previously discussed conventional RRO time averaging methods, which require several hundreds of rotations to accurately determine the RRO.

Figure 6:
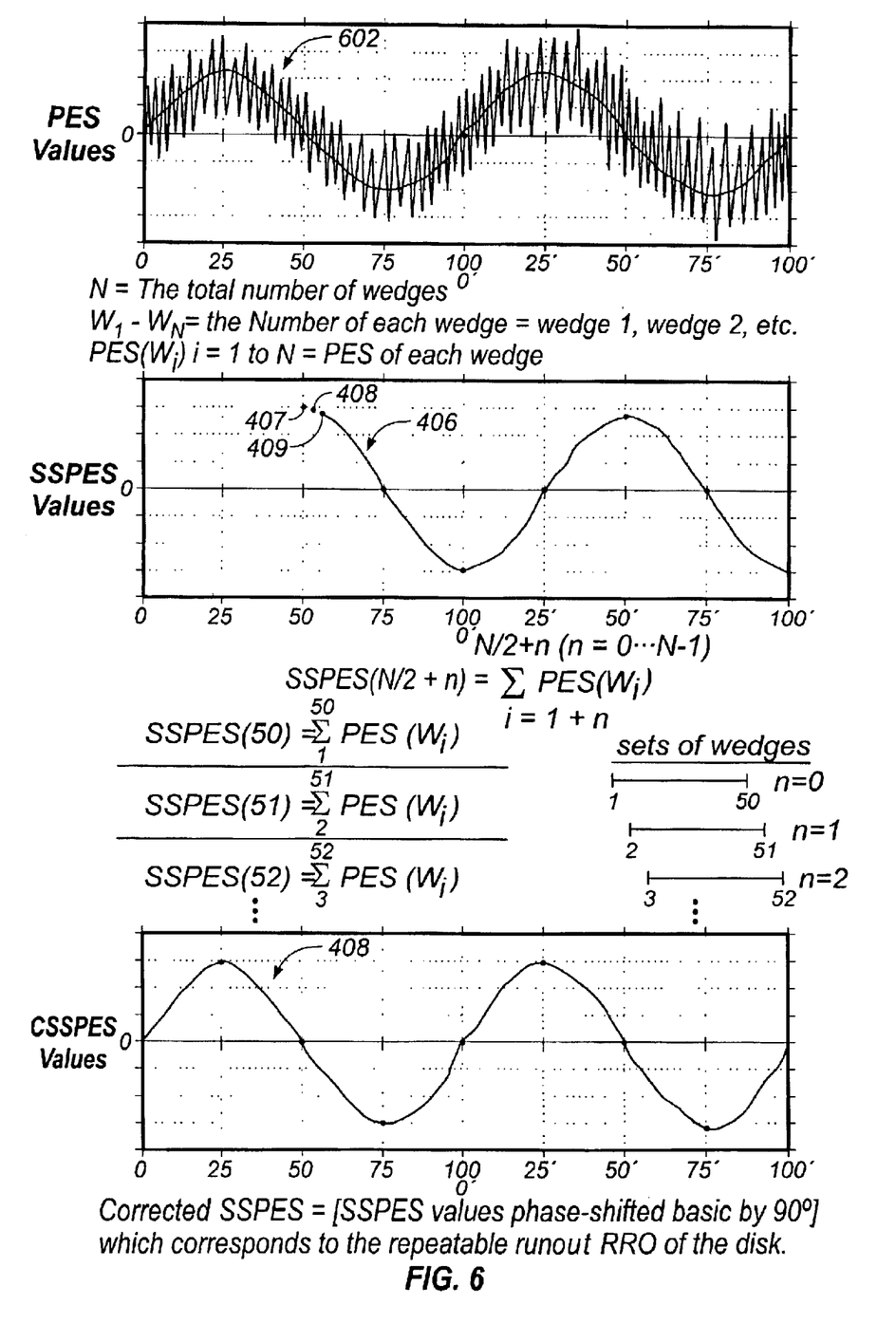
FIG. 6 shows exemplary graphs of PES, SSPES, and CSSPES values and is exactly the same as FIG. 4, except that the PES values are shown as they are truly measured, including NRRO.

Turning briefly to FIG. 6, FIG. 6 is exactly the same as FIG. 4, except that the PES values processed by the servo controller are shown by line 602 including NRRO. Typically PES values processed by the servo controller include both RRO and NRRO. The invention by calculating the previously described SSPES and CSSPES values, by consecutively averaging different sets of wedges (previously discussed in detail), as shown by line 406 which illustrates the SSPES values and by line 408 which illustrates the resultant CSSPES values, results in the NRRO being averaged out. Thus, as shown by line 408, the resultant CSSPES values corresponding to the repeatable runout (RRO) of the disk takes into account the NRRO.

Figure 3C:
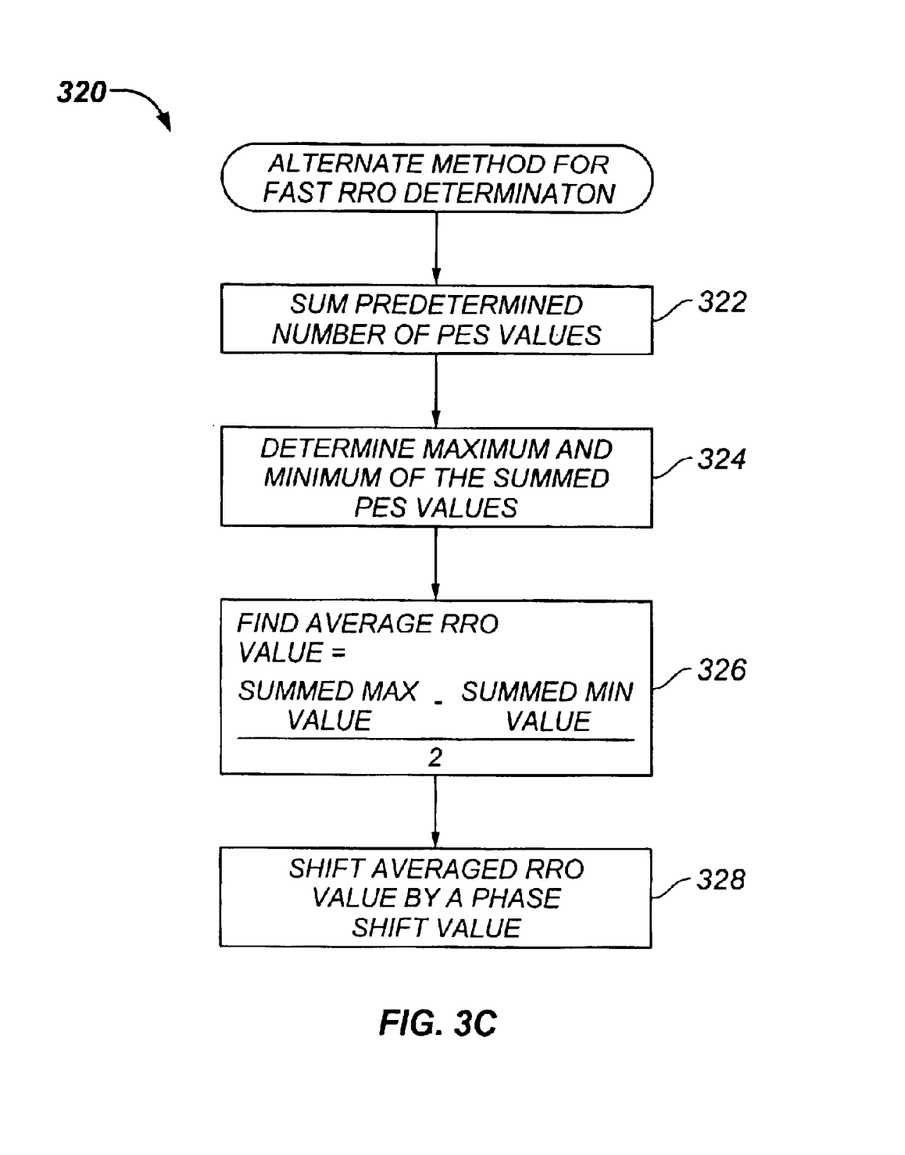
FIG. 3C is a flowchart showing another embodiment of the method of the invention for fast RRO determination.

Turning now to FIG. 3C, a flowchart of another embodiment of the method of the invention for fast RRO determination is illustrated. This method 320 involves determining the RRO in a continuous fashion, instead of by utilizing a moving average of different sets of servo wedges as previously discussed. At step 322, a predetermined number of PES values are summed. For example, this predetermined number of PES values could correspond to PES values for the servo wedges of the entire track (e.g. wedges 0–100), for the servo wedges of the entire track for multiple rotations of the track, or for a subset of the servo wedges of the track. Next, at step 324, a maximum (Max.) and a minimum (Min.) value of the summed PES values are determined. Then, at step 326, an average RRO value is found by the equation: (Summed Max. value−Summed Min. value)/2. It should be appreciated that any number of PES values can be used by this method to determine the RRO with a desired amount of noise reduction. At step 328, the average RRO value can then be shifted by a phase value to be in phase with the RRO of the disk, and particularly, to be in phase with the moveable head performing track following and the PES values measured by the servo control loop.

Figure 7:
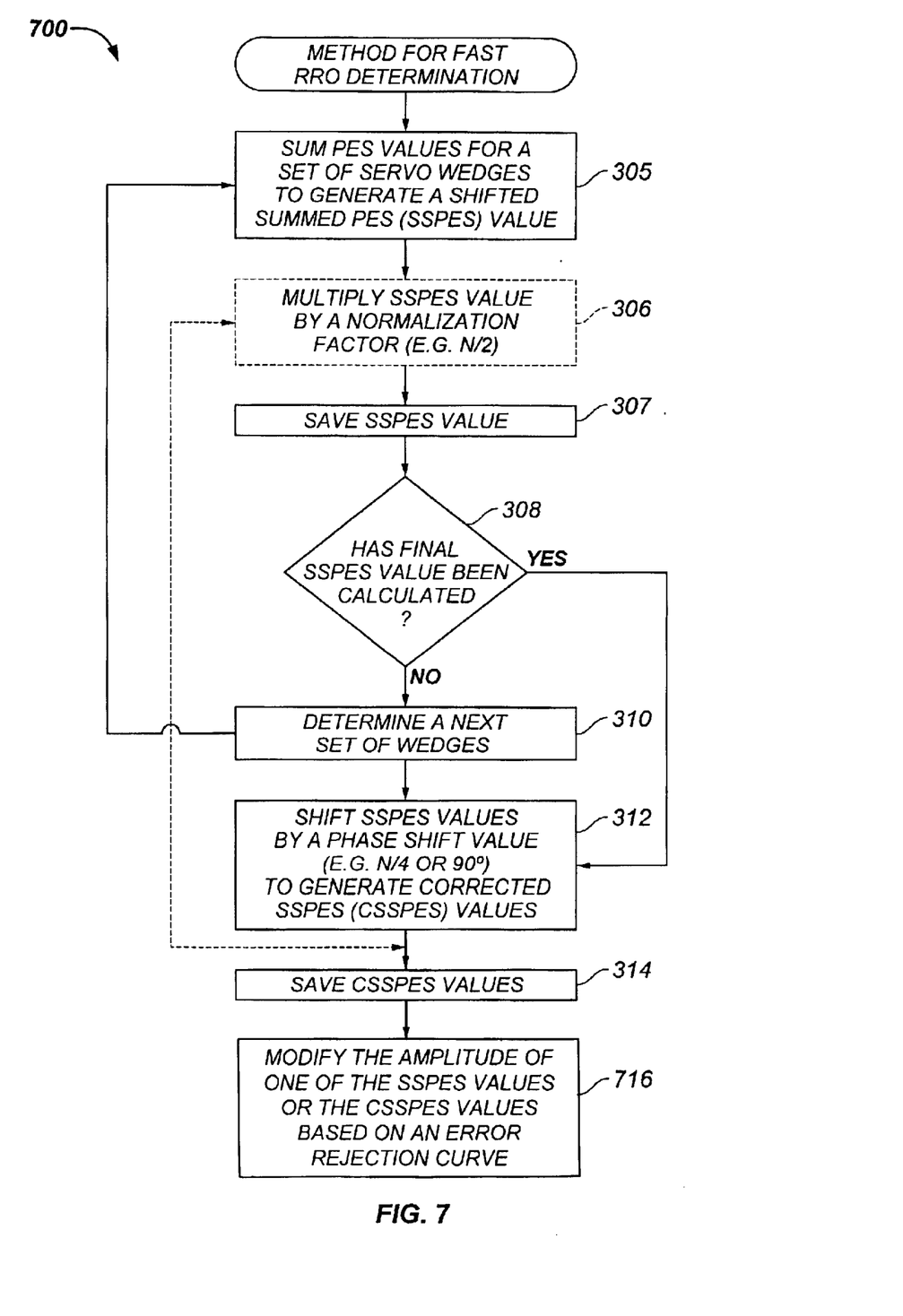
FIG. 7 is a flowchart showing another embodiment of the method of the invention for fast repeatable runout (RRO) determination including amplitude modification.

Referring now to FIG. 7, FIG. 7 is a flowchart showing another embodiment of the method of the invention for fast repeatable runout (RRO) determination including amplitude modification. The method 700 includes all of the previous discussed method steps of method 304, particularly method steps 305, 306, 307, 308, 310, 312, and 314 to generate the SSPES and CSSPES values. These methods steps were previously discussed in detail and, therefore, will not be repeated for brevity's sake. Thus, after the calculation of the CSSPES values 312 and the saving of the CSSPES values 314, as previously discussed, method 700 include the method step 716 in which the amplitude of one of either the SSPES values or the CSSPES values is modified based on an error rejection curve for the servo control loop. After the calculations of the SSPES values or the CSSPES values, which are shown in FIG. 4 as lines 406 and 408, respectively, the amplitude of these values may be modified based on an error rejection curve for the servo control loop. For example, the amplitude of the SSPES values or the CSSPES values may be modified based on a predicted (product specific) error rejection curve for the servo control loop of the disk drive 30 or a measured (drive specific) error rejection curve for the servo control loop of the disk drive 30. In some applications, the SSPES and/or the CSSPES values may be scaled by only the normalization factor, by both the normalization factor and the error rejection curve, or by only the error rejection curve. Further, it should be appreciated that, the amplitudes of the SSPES values and/or the CSSPES values may be scaled by the normalization factor and/or the error rejection curve, as each SSPES and/or CSSPES value is individually calculated.

Figure 8A:
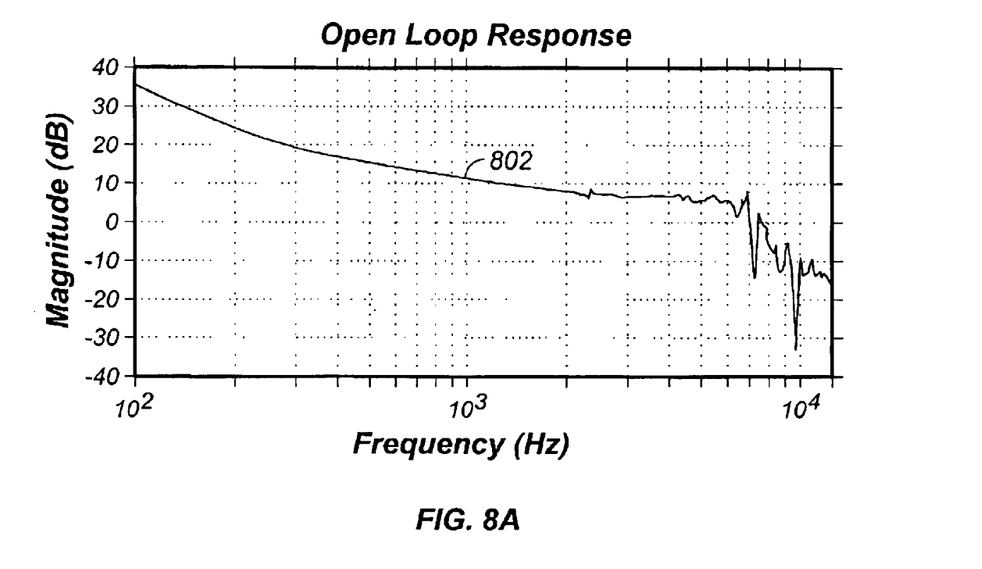
FIG. 8A is a Bode plot showing an example of an open-loop frequency response of an open-loop servo control system for a drive product.

FIG. 8A is a Bode plot showing an example of an open-loop frequency response of an open-loop servo control system for a drive product (e.g. the disk drive 30). In particular, FIG. 8A shows the open loop system's magnitude response as a ratio of output to input with a magnitude curve 802.

Figure 8B:
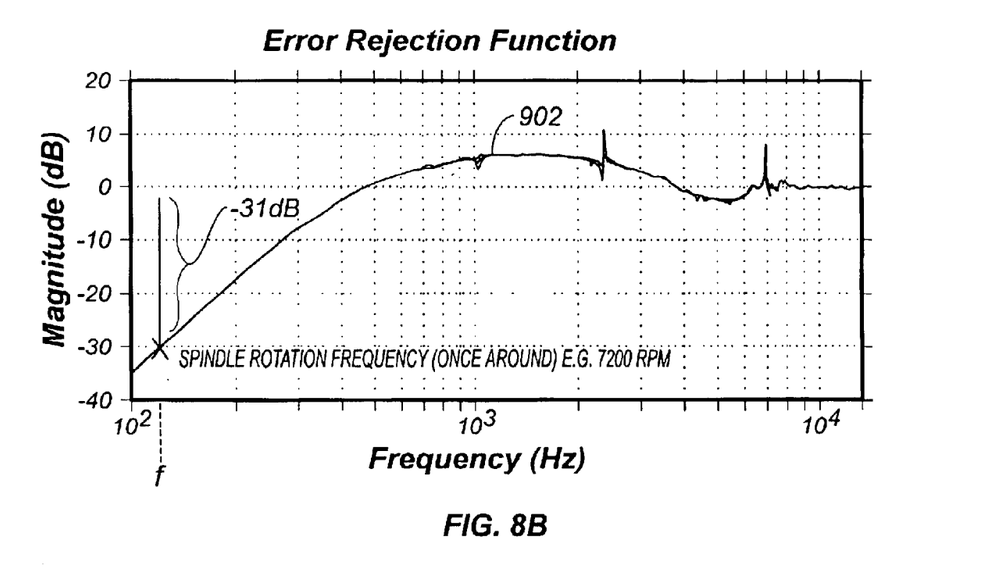
FIG. 8B is a Bode plot showing the error rejection curve of the closed-loop servo control system for the drive product.

FIG. 8B is a Bode plot showing the error rejection curve of the closed-loop servo control system for the drive product (e.g. the disk drive 30). The error rejection curve 902 is defined by the equation $$\frac{1}{1+GH}$$

at a spindle rotation frequency, f. Particularly, the error rejection curve equation may be denoted as $$\frac{1}{1+G(f)H(f)}.$$

More particularly, in the present case we are looking at the once around frequency $f_{1x}$, such that $f_{1x}$, in which case the error rejection equation becomes $$\frac{1}{1+G(f1x)H(f1x)}.$$

In control system theory, G is usually referred to as the servo compensator, and H is generally known as the mathematical model of the plant (in this case the disk drive 30). As previously discussed, the error rejection curve may be either measured or predicted.

Particularly, as shown in FIG. 8B, it can be seen that at spindle rotation frequency f (once around) at for example, 7200 RPM or 120 Hz, that the magnitude of the error rejection curve is approximately −31 dB or approximately 1/35.5 (i.e. the servo control loop rejects the error by 97.1% of its original value at that frequency). Therefore, the actual RRO at the spindle rotation frequency f (e.g. 120 Hz) is approximately 35.5 times larger than the measured amplitudes of the SSPES or CSSPES values, which were measured without the characterization of the closed-loop system by the error rejection curve. Accordingly, the amplitude of the SSPES or CSSPES values may be modified based on the error rejection curve at spindle rotation frequency, f (e.g. 120 Hz), to account for this. In other words, the amplitude of the SSPES or CSSPES values may be multiplied by an approximate factor of 35.5 to more accurately reflect the true value of the RRO. There are many different ways to implement the cancellation of RRO (e.g. feed-forward techniques).

Depending upon the implementation, an error rejection curve, as previously described, may be utilized in conjunction with the calculated SSPES and/or CSSPES values to compensate for RRO. Alternatively, the use of an error rejection curve in the cancellation of RRO may be completely bypassed.

The methods and processes previously discussed can be employed for disk drives with an embedded servo system. Numerous alternative methods for RMSDs with similar or other media format characteristics can be employed by those skilled in the art to use the invention with equal advantage to implement the fast RRO determination techniques previously discussed. Further, although the embodiments have been described in the context of a disk drive with embedded servo sectors, the invention can be employed in many different types of RMSDs having any type of head actuator scanning the media.

I claim:

1. In a rotating media storage device (RMSD), the RMSD having a disk including at least one track having a plurality of servo wedges, a moveable head, a servo control loop for controlling the position of the moveable head to perform track following, a method for repeatable runout (RRO) determination, the method comprising the steps of:
   a. track following on the plurality of servo wedges of the track to obtain a plurality of position error signal (PES) values;
   b. summing the PES values for a plurality of different sets of servo wedges of the track to generate a plurality of shifted summed position error signal (SSPES) values; and
   c. shifting the plurality of SSPES values for the track by a phase shift value to generate a plurality of corrected shifted summed position error signal (CSSPES) values corresponding to the repeatable runout.

2. The method of claim 1, wherein a normalization factor is applied to one of:
   a. the generated SSPES values;
   b. or the generated CSSPES values.

3. The method of claim 2, wherein the normalization factor is a constant divided by one half of the total number of servo wedges of the track.

4. The method of claim 3, wherein each set of servo wedges includes a predetermined number of servo wedges that is one half of the total number of servo wedges of the track.

5. The method of claim 4, wherein the phase shift value is one quarter of the total number of servo wedges of the track.

6. The method of claim 3, wherein the constant is equal to a value of approximately 1.57.

7. The method of claim 6, wherein each set of servo wedges includes a predetermined number of servo wedges that is one quarter of the total number of servo wedges of the track.

8. The method of claim 7, wherein the phase shift value is one eighth of the total number of servo wedges of the track.

9. The method of claim 1, further comprising modifying the amplitude of one of the SSPES values or the CSSPES values based on an error rejection curve for the servo control loop (FIG. 8).

10. The method of claim 9, wherein the error rejection curve is a predicted error rejection curve.

11. The method of claim 10, wherein the amplitude of the one of the CSSPES values or the SSPES values is modified based on the predicted error rejection curve for a specific frequency value.

12. The method of claim 11, wherein the specific frequency value is an integral multiple of a spindle rotational frequency.

13. The method of claim 9, wherein the error rejection curve is a measured error rejection curve.

14. The method of claim 13, wherein the amplitude of the one of the CSSPES values or the SSPES values is modified based on the measured error rejection curve for a specific frequency value.

15. The method of claim 14, wherein the specific frequency value is an integral multiple of a spindle rotational frequency.

16. A rotating media storage device (RMSD), the RMSD having a disk including at least one track having a plurality of servo wedges, a moveable head, the RMSD further comprising:
   a servo control loop for controlling the position of the moveable head to perform track following on a plurality of servo wedges of a track and to measure a plurality of position error signal (PES) values; and
   a microprocessor under the control of a program to:
   a. receive the plurality of position error signal (PES) values;
   b. sum the PES values for a plurality of different sets of servo wedges of the track to generate a plurality of shifted summed position error signal (SSPES) values; and
   c. shift the plurality of SSPES values for the track by a phase shift value to generate a plurality of corrected shifted summed position error signal (CSSPES) values.

17. The RMSD of claim 16, wherein a normalization factor is applied to one of:
   a. the generated SSPES values;
   b. or the generated CSSPES values.

18. The RMSD of claim 17, wherein the normalization factor is a constant divided by one half of the total number of servo wedges of the track.

19. The RMSD of claim 18, wherein each set of servo wedges includes a predetermined number of servo wedges that is one half of the total number of servo wedges of the track.

20. The RMSD of claim 19, wherein the phase shift value is one quarter of the total number of servo wedges of the track.

21. The RMSD of claim 18, wherein the constant is equal to a value of approximately 1.57.

22. The RMSD of claim 21, wherein each set of servo wedges includes a predetermined number of servo wedges that is one quarter of the total number of servo wedges of the track.

23. The RMSD of claim 22, wherein the phase shift value is one eighth of the total number of servo wedges of the track.

24. The RMSD of claim 16, further comprising the microprocessor modifying the amplitude of one of the SSPES values or one of the CSSPES values based on an error rejection curve for the servo control loop.

25. The RMSD of claim 24, wherein the error rejection curve is a predicted error rejection curve.

26. The RMSD of claim 25, wherein the amplitude of the one of the CSSPES values or the SSPES values is modified based on the predicted error rejection curve for a specific frequency value.

27. The RMSD of claim 26, wherein the specific frequency value is an integral multiple of a spindle rotational frequency.

28. The RED of claim 24, wherein the error rejection curve is a measured error rejection curve.

29. The RMSD of claim 28, wherein the amplitude of the one of the CSSPES values or the SSPES values is modified based on the measured error rejection curve for a specific frequency value.

30. The RMSD of claim 29, wherein the specific frequency value is an integral multiple of a spindle rotational frequency.

31. A computer system comprising a host computer and a rotating media storage device (RMSD), the RMSD further comprising:
   a disk including at least one track having a plurality of servo wedges;
   a moveable head;
   a servo control loop for controlling the position of the moveable head to perform track following on a plurality of servo wedges of a track and to measure a plurality of position error signal (PES) values; and
   a microprocessor under the control of a program to:
      a. receive the plurality of position error signal (PES) values;
      b. sum the PES values for a plurality of different sets of servo wedges of the track to generate a plurality of shifted summed position error signal (SSPES) values; and
      c. shift the plurality of SSPES values for the track by a phase shift value to generate a plurality of corrected shifted summed position error signal (CSSPES) values.

32. The computer system of claim 31, wherein a normalization factor is applied to one of:
   a. the generated SSPES values;
   b. or the generated CSSPES values.

33. The computer system of claim 32, wherein the normalization factor is a constant divided by one half of the total number of servo wedges of the track.

34. The computer system of claim 33, wherein each set of servo wedges includes a predetermined number of servo wedges that is one half of the total number of servo wedges of the track.

35. The computer system of claim 34, wherein the phase shift value is one quarter of the total number of servo wedges of the track.

36. The computer system of claim 33, wherein the constant is equal to a value of approximately 1.57.

37. The computer system of claim 36, wherein each set of servo wedges includes a predetermined number of servo wedges that is one quarter of the total number of servo wedges of the track.

38. The computer system of claim 37, wherein the phase shift value is one eighth of the total number of servo wedges of the track.

39. The computer system of claim 31, further comprising the microprocessor modifying the amplitude of one of the SSPES values or the CSSPES values based on an error rejection curve for the servo control loop.

40. The computer system of claim 39, wherein the error rejection curve is a predicted error rejection curve.

41. The computer system of claim 40, wherein the amplitude of the one of the CSSPES values or the SSPES values is modified based on the predicted error rejection curve for a specific frequency value.

42. The computer system of claim 41, wherein the specific frequency value is an integral multiple of a spindle rotational frequency.

43. The computer system of claim 39, wherein the error rejection curve is a measured error rejection curve.

44. The computer system of claim 43, wherein the amplitude of the one of the CSSPES values or the SSPES values is modified based on the measured error rejection curve for a specific frequency value.

45. The computer system of claim 44, wherein the specific frequency values is an integral multiple of a spindle rotational frequency.

* * * * *